(12) United States Patent
Chang (10) Patent No.: US 10,039,408 B2
(45) Date of Patent: Aug. 7, 2018

(54) HANGING DEVICE WITH DISPOSABLE BEVERAGE FILTER BAG

(71) Applicant: Ying-Yen Chang, Changhua County (TW)

(72) Inventor: Ying-Yen Chang, Changhua County (TW)

( * ) Notice: Subject to any disclaimer, the term of this patent is extended or adjusted under 35 U.S.C. 154(b) by 8 days.

(21) Appl. No.: 15/292,271

(22) Filed: Oct. 13, 2016

(65) Prior Publication Data

US 2017/0105569 A1    Apr. 20, 2017

(30) Foreign Application Priority Data

Oct. 20, 2015    (TW) .............................. 104216830 U (51) Int. Cl.
*A47J 31/06* (2006.01)
*B65D 85/812* (2006.01)

(52) U.S. Cl.
CPC ........ *A47J 31/0626* (2013.01); *B65D 85/812* (2013.01)

(58) Field of Classification Search
CPC ............................ A47J 31/0626; B65D 85/812
See application file for complete search history.

(56) References Cited

U.S. PATENT DOCUMENTS

| | | | | |
|---|---|---|---|---|
| 3,215,533 A * | 11/1965 | Rambold | ............. | B65D 85/812 206/0.5 |
| 3,616,934 A * | 11/1971 | Ehrlich | ............... | A47J 31/0636 210/441 |
| 4,052,319 A * | 10/1977 | Friedman | ............ | A47J 37/1223 210/465 |
| 4,448,686 A * | 5/1984 | Friedman | ............ | A47J 37/1223 210/238 |
| 4,560,475 A * | 12/1985 | Kataoka | ............. | B65D 85/8043 210/249 |
| 4,715,271 A * | 12/1987 | Kitagawa | ........... | B65D 85/8043 210/474 |
| 4,726,956 A * | 2/1988 | Christie | ............... | B65D 85/812 206/0.5 |
| D302,635 S * | 8/1989 | Friedman | ....................... | D7/667 |
| 4,863,601 A * | 9/1989 | Wittekind | ............... | A47J 31/02 206/0.5 |
| 4,948,601 A * | 8/1990 | Serbu | ................... | B65D 85/812 206/5 |

(Continued)

FOREIGN PATENT DOCUMENTS

DE          3310276      * 10/1984

*Primary Examiner* — Ibrahime A Abraham
*Assistant Examiner* — Frederick Calvetti
(74) *Attorney, Agent, or Firm* — Jackson IPG PLLC; Demian K. Jackson (57) ABSTRACT

A hanging device with a disposable beverage filter bag includes a filter bag and a hanging ring. The filter bag is made of a filter fabric or filter paper to form a flattened single-opening bag. The filter bag has an opening at an upper end thereof and a pair of hanging slits transversely symmetrically located at middle sections of two sides close to the upper end. The hanging slits are half the width of the opening. The hanging ring is made of a stainless steel wire by winding. The hanging ring has a pair of hanging portions protruding outward from middle sections of two sides of a main frame. When in use, the hanging slits of the filter bag are hanged on the hanging portions of the hanging ring to form a filter stand.

7 Claims, 6 Drawing Sheets

(56) References Cited

U.S. PATENT DOCUMENTS

| | | | | |
|---|---|---|---|---|
| 4,981,588 A * | 1/1991 | Poulallion | A47J 31/02 | 210/474 |
| 5,059,325 A * | 10/1991 | Iida | A47J 31/02 | 210/474 |
| 5,064,533 A * | 11/1991 | Anson | B01D 29/085 | 210/232 |
| 5,132,124 A * | 7/1992 | Tamaki | A47G 19/16 | 210/474 |
| 5,176,830 A * | 1/1993 | Wiggins | A47J 31/06 | 210/477 |
| 5,318,786 A * | 6/1994 | Clarkson | B65D 85/812 | 426/79 |
| 5,468,383 A * | 11/1995 | McKenzie | B01D 29/15 | 210/232 |
| 5,605,710 A * | 2/1997 | Pridonoff | A47J 31/02 | 206/0.5 |
| 5,620,724 A * | 4/1997 | Adler | A47G 19/22 | 426/435 |
| 5,736,042 A * | 4/1998 | Aoki | A47J 31/02 | 210/474 |
| 5,937,737 A * | 8/1999 | Karell | A47G 19/16 | 426/80 |
| 6,038,963 A * | 3/2000 | Patterson | A47J 31/0626 | 99/287 |
| 6,079,318 A * | 6/2000 | Davis | A47J 31/005 | 99/279 |
| 6,250,209 B1 * | 6/2001 | Pope | A47J 31/0631 | 99/323 |
| 6,487,961 B2 * | 12/2002 | Bunn | A47J 31/06 | 99/306 |
| 6,589,577 B2 * | 7/2003 | Lazaris | B65D 85/8043 | 206/0.5 |
| 6,844,015 B2 * | 1/2005 | Yuguchi | B65D 85/8043 | 206/0.5 |
| 8,216,464 B2 * | 7/2012 | Brewington | A47J 31/446 | 210/232 |
| 9,060,643 B2 * | 6/2015 | Chang | A47J 31/20 | |
| 2003/0164313 A1 * | 9/2003 | Stemmler | B65D 85/8085 | 206/0.5 |
| 2004/0222147 A1 * | 11/2004 | Post | A47J 31/02 | 210/493.1 |
| 2005/0224373 A1 * | 10/2005 | Bailey | B65B 9/093 | 206/219 |
| 2009/0199722 A1 * | 8/2009 | Bodum | A47J 31/02 | 99/323 |
| 2011/0219956 A1 * | 9/2011 | Englert | A47J 27/21041 | 99/285 |
| 2012/0000369 A1 * | 1/2012 | Saitoh | A47J 31/005 | 99/279 |
| 2014/0212546 A1 * | 7/2014 | Koestring | A47J 31/0626 | 426/82 |

* cited by examiner

HANGING DEVICE WITH DISPOSABLE BEVERAGE FILTER BAG

FIELD OF THE INVENTION

The present invention relates to a hanging device with a disposable beverage filter bag for brewing coffee, tea or the like. The filter bag made of a filter fabric or filter paper to form a flattened single-opening bag cooperates with a hanging ring to form a filter stand. The hanging ring is made of a stainless steel wire by winding, which can be reused. The filter bag is transversely formed with a pair of hanging slits, so that the filter bag can be quickly hanged on the hanging ring. The operation is simple, and it is convenient to carry the filter stand.

BACKGROUND OF THE INVENTION

A brewing machine for coffee, tea, tea and other beverages is expensive, bulky and inconvenient to carry. Therefore, there are various manual brewing devices on the market. For the demands of a simple structure, convenient use, easy carrying and hygiene, drip coffee bags are developed accordingly.

A conventional drip coffee bag is an integral structure and has a pair of hanging lugs at two sides thereof. The drip coffee bag is prefilled with coffee powder. When in use, the hanging lugs are expanded to hang on two sides of the top rim of a cup and then the user pours in hot water for brewing coffee. After brewing, the entire drip coffee bag with the coffee grounds is thrown away.

The advantage of the drip coffee bag is that its size is small. However, the manufacture cost is high because the drip coffee bag must have a "fixing paperboard" laminated on both sides of the filter bag. The paperboard may be bleached. The materials of the paperboard and the bag are different, so it is necessary to use an adhesive or the like to bind the paperboard the bag. It is not safe for drinking when the drip coffee bag is infused at a high temperature.

Furthermore, after each use, the paperboard and the filter bag are discarded. The paperboard is only used once, which takes at least half the cost and cannot be reused at all. This is a waste of resources.

Accordingly, the inventor of the present invention has devoted himself based on his many years of practical experiences to solve this problem.

SUMMARY OF THE INVENTION

The primary object of the present invention is to provide a hanging device with a disposable beverage filter bag. The present invention comprises a filter bag and a hanging ring. The filter bag is made of a filter fabric or filter paper to form a flattened single-opening bag. The hanging ring is made of a stainless steel wire by winding, which can be reused. The filter bag is used to filter coffee grounds or tea leaves or the like. The filter bag can be discarded or cleaned to lower the cost of the filter material, so it is cost-effective and environment-friendly.

Another object of the present invention is to provide a hanging device with a disposable beverage filter bag, which is simple for assembly and convenient for use. Through the hanging ring, when used, a hanging slit at one side of the filter bag is first hanged on a hanging portion of the hanging ring, and then another hanging slit at the other side of the filter bag is slightly pulled to hang on another hanging portion of the hanging ring, so that the upper section of the filter bag is hanged on the two hanging portions of the hanging ring to form a rectangular-like shape to open an opening of the filter bag. After brewing, the user holds and presses the front section of the U-shaped holding portion to retract the two hanging portions inward, so that the hanging slits at the two sides of the filter bag lose the support of the hanging portions and the filter bag slides down quickly. Thus, it is obvious to demonstrate that the present invention provides excellent convenience in terms of preparations for brewing coffee, tea or the like.

A further object of the present invention is to provide a hanging device with a disposable beverage filter bag, which has different operation choices. A rear section of the U-shaped holding portion of the hanging ring is provided with a handle for the user to hold the hanging ring conveniently. The handle has a forked portion with a clip opening at a lower end thereof. When in use, the forked portion with the clip opening clamps the top rim of the container, such that the entire filter stand can be connected above the container and stand stably for the use to pour in hot water toward the filter bag to brew coffee or tea. Alternatively, the filter bag with coffee powder or tea leaves may be infused in the container to extract the flavor. After brewing, the entire filter stand may be positioned on the top rim of the container. The present invention has different operation ways for the user to choose according to his/her favorite and demand.

A yet another object of the present invention is to provide a hanging device with a disposable beverage filter bag, which can be carried conveniently. The filter bag is in a flattened shape. A plurality of filter bags can be stacked one by one for carrying. Besides, the area of the annular hanging ring is less than that of the filter bag, and the annular hanging ring and the handle can be separated from each other. All the filter bags, the hanging ring, and the handle can be stacked and stored in a bag slightly greater in size than the filter bags for carrying. The user only needs to supply coffee powders, tea leaves, or the like. When going out, any container or cup or paper cup nearby able to accommodate the filter bag can be used for brewing anytime anywhere. It is convenient for cleaning after brewing to meet the requirements for carrying conveniently.

DESCRIPTION OF THE PREFERRED EMBODIMENTS

Embodiments of the present invention will now be described, by way of example only, with reference to the accompanying drawings.

Figure 1:
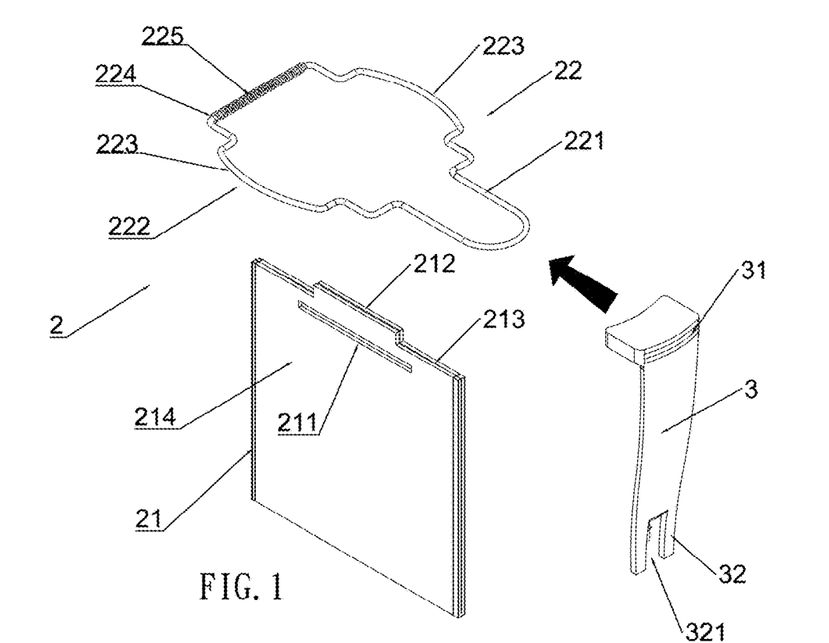
FIG. 1 is an exploded view of the present invention.
Figure 1A:
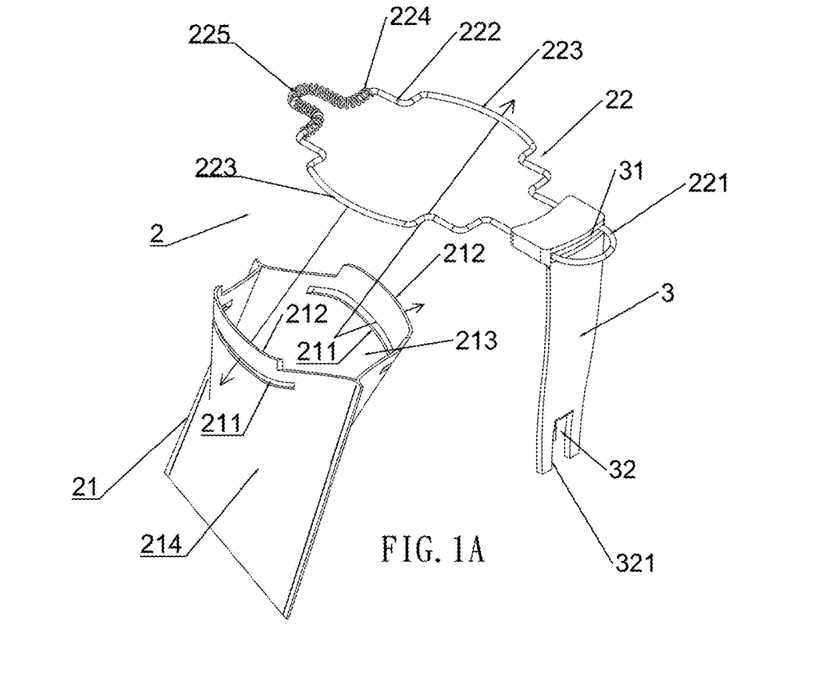
FIG. 1A is an assembled view of the present invention.
Figure 2:
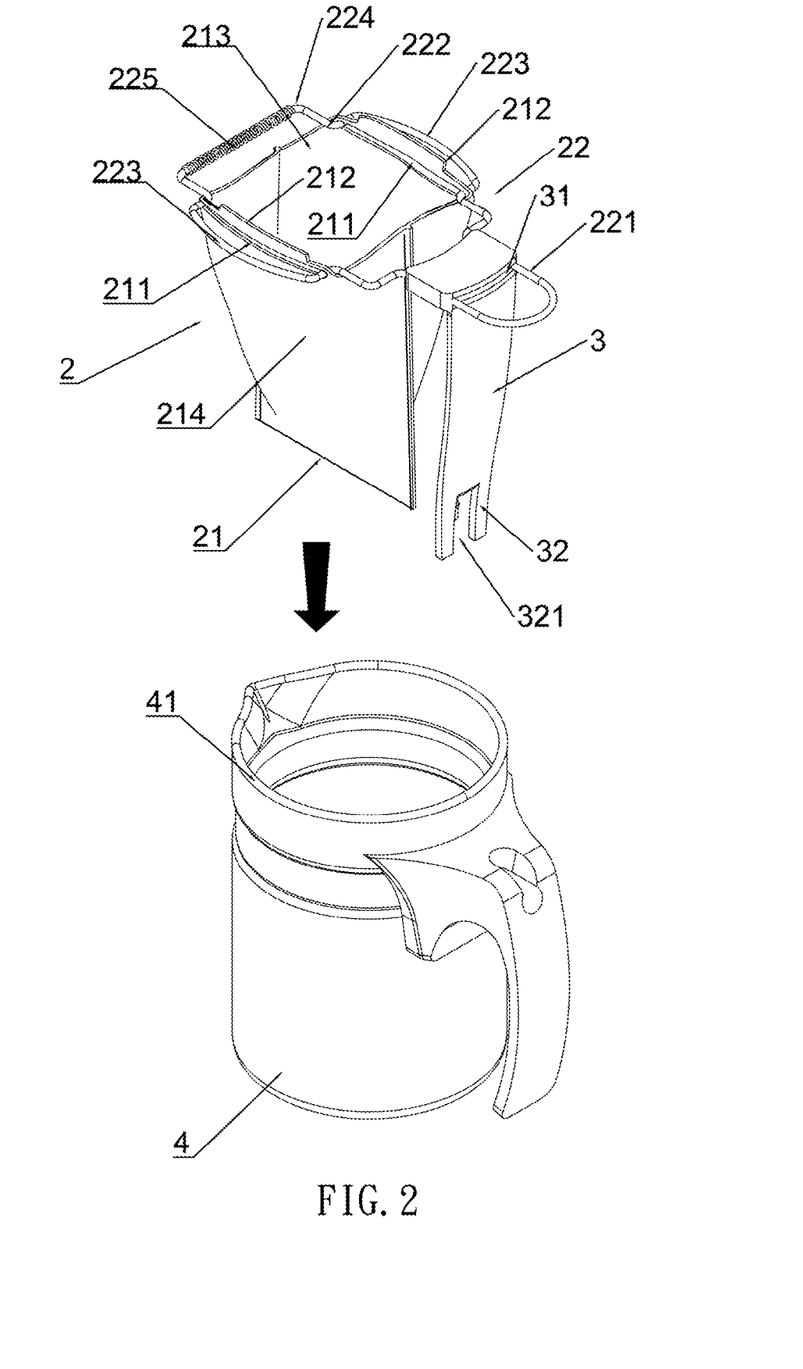
FIG. 2 is a perspective view of the present invention ready for use.

Referring to FIG. 1, FIG. 1A, and FIG. 2, a hanging device with a disposable beverage filter bag in accordance with a preferred embodiment of the present invention comprises a filter bag 21 and an annular hanging ring 22.

The filter bag 21 is made of a filter fabric or filter paper to form a flattened single-opening bag. The filter bag 21 has an opening 213 at an upper end thereof and a pair of hanging slits 211 transversely symmetrically located at middle sections of two sides close to the upper end. The hanging slits 211 are half the width of the opening 213.

The hanging ring 22 is made of a stainless steel wire by winding. A rear section of the hanging ring 22 is a U-shaped holding portion 221. A front section of the hanging ring 22 symmetrically extends forward from the holding portion 221 and has a notch 224 at the frontmost end, and the notch 224 is connected with two ends of a coil spring 225 to form a retractable main frame 222. Middle sections of two sides of the main frame 222 protrude outward to form a pair of hanging portions 223 each having a width slightly greater than that of the hanging slits 211 of the filter bag 21. The caliber of the pair of hanging portions 223 is greater than that of a kettle-shaped container 4 or a cup-shaped container 4, so that the pair of hanging portions 223 can be placed across a top rim 41 of the container 4.

Through the hanging ring 22, when used, the hanging slit 211 at one side of the filter bag 22 is first hanged on one hanging portion 223, and then the hanging slit 211 at the other side of the filter bag 21 is slightly pulled to hang on the other hanging portion 223, so that the upper section of the filter bag 21 is to form a rectangular-like shape to open the opening 213 for pouring in hot water, and the lower section of the filter bag 21 is uprightly suspended beneath the hanging ring 22 to form a simple assembled filter stand 2 for brewing coffee or tea. This enables the filer bag 21 to trap the coffee grounds or tea leaves and allows the liquid coffee or tea to flow through.

A rear section of the U-shaped holding portion 221 of the hanging ring 22 is provided with a handle 3. The handle 3 has a forked portion 32 with a clip opening 321 at a lower end thereof and a transverse connecting slot 31 at an upper end thereof for the holding portion 221 to be inserted therethrough. The forked portion 32 with the clip opening 321 is elastic for the top rim 41 of a different thickness. When in use, the forked portion 32 with the clip opening 321 clamps the top rim 41 of the container 4, such that the entire filter stand 2 can be connected above the container 4 and stand stably, as shown in FIG. 2B.

The handle 3 is movable along the holding portion 221 according to the caliber of the container 4, so that the present invention can be applied to various containers 4 of different calibers.

Figure 2A:
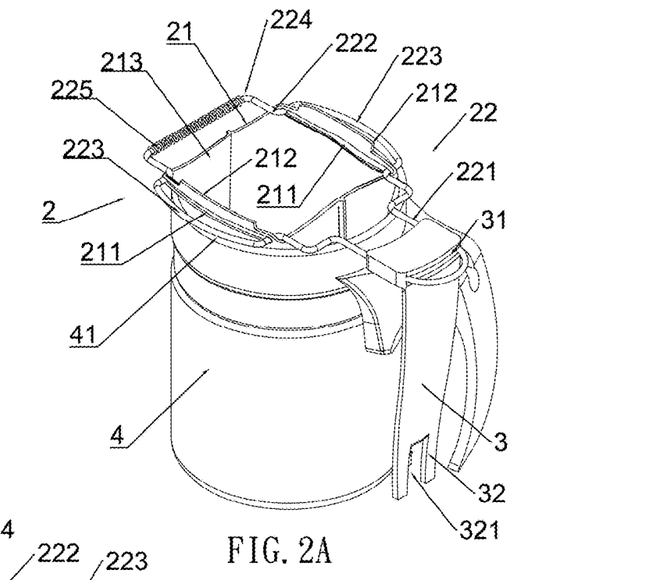
FIG. 2A is a perspective view of the present invention in a use state.

As shown in FIG. 2A, the filter bag 21 of the filter stand 2 is placed into the selected container 4, and the enlarged hanging portions 223 of the main frame 222 of the hanging ring 22 are placed across the top rim 41 of the container 4. The bag body 214 of the filter bag 21 won't reach to the bottom of the container, so the filter stand 2 is suspended in the container 4. The user may put coffee powders or tea leaves into the filter bag 21 from the opening 213 and pour in hot water slowly to brew coffee or tea.

Figure 2B:
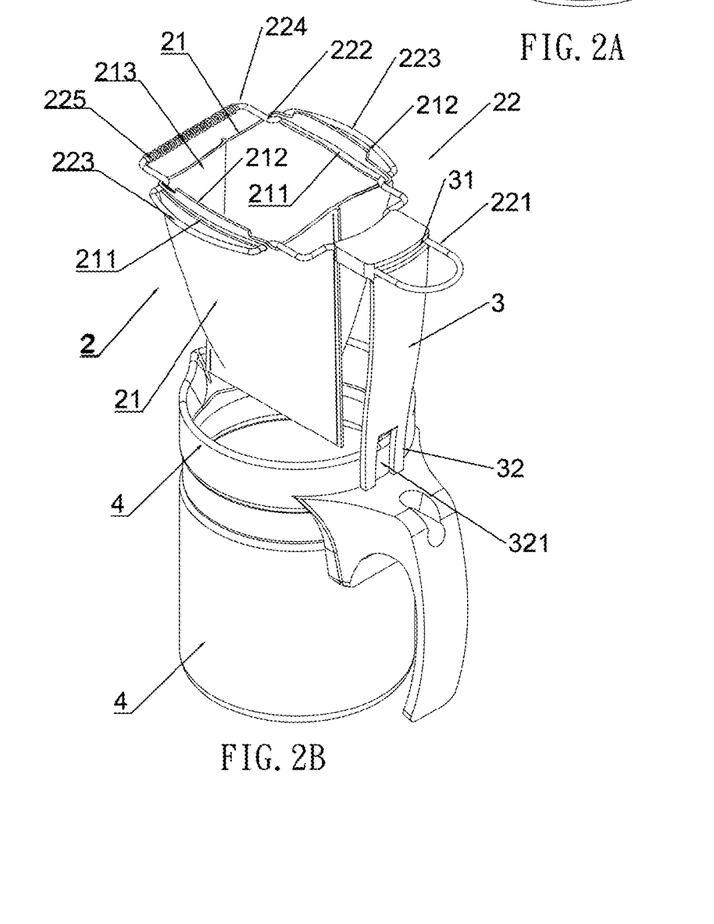
FIG. 2B is a perspective view of the present invention in another use state.

As shown in FIG. 2B, after the coffee and tea has been extracted, the user can hold the holding portion 221 or the handle 3 to lift the entire filter stand 2 to stay above the top rim 41 of the container 4; or the forked portion 32 at the lower end of the handle 3 is used to clamp the top rim 41 of the container 4 for the entire filter stand 2 to stand above the top rim 41 of the container 4. During the lift of the filter stand 2, most of the brew has passed through the bag body 214 to be collected in the container 4. After the filter stand 2 is held or placed above the container 4, the remaining brew continues to pass through the bag body 214 to drip in the container 4.

As shown in FIG. 2, when the coffee grounds or the tea leaves in the filter bag 21 have no residual water or are in a substantially dry state, the entire filter stand 2 is moved away from the container 4 to complete the brewing. The user can directly take the container 4 for drinking coffee or tea.

As shown in FIG. 2B, the user may lift the entire filter stand 2, and the forked portion 32 at the lower end of the handle 3 is used to clamp the top rim 41 of the container 4, so that the entire filter stand 2 is placed across the top rim 41 of the container 4. After that, the user puts coffee powders or tea leaves into the filter bag 21 from the opening 213 and pours in hot water slowly to brew coffee or tea.

During brewing, the brew passes through the bag body 214 of the filter bag 21 to be collected in the container 4. When the coffee grounds or the tea leaves in the filter bag 21 have no residual water or are in a substantially dry state, the entire filter stand 2 is moved away from the container 4 to complete the brewing. The user can directly take the container 4 for drinking coffee or tea.

Figure 2C:
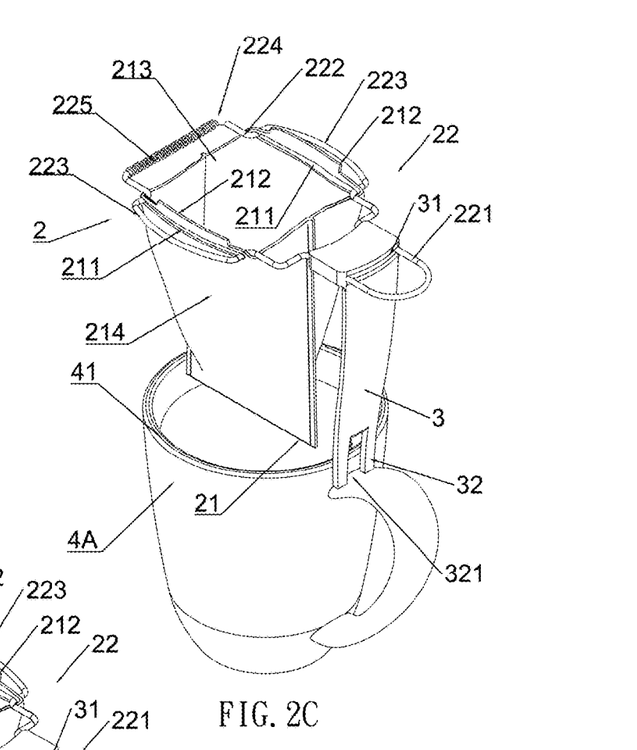
FIG. 2C is a perspective view of the present invention in a further use state.
Figure 2D:
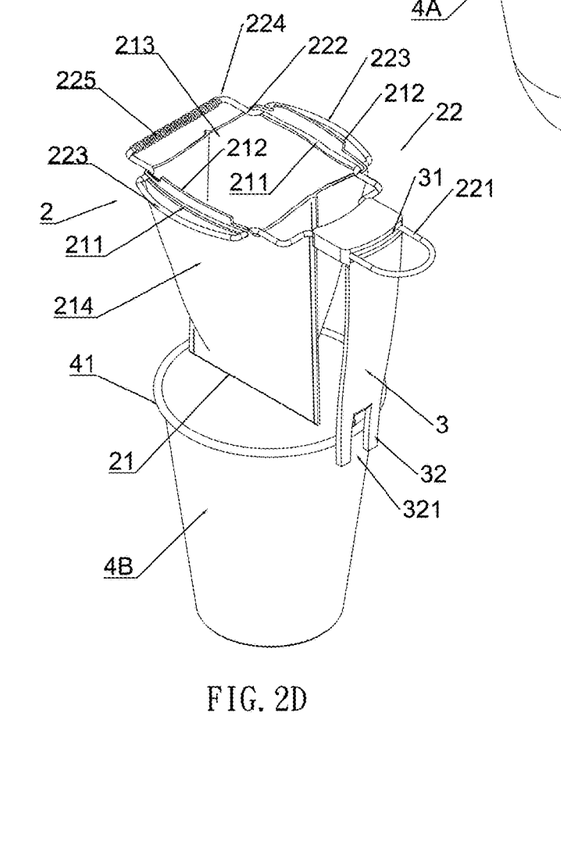
FIG. 2D is a perspective view of the present invention in yet another use state.

According to the aforesaid and the drawings, the container 4 may be a straight glass kettle. The filter bag 21 is made of a fabric or a soft material. After the filter bag 21 is combined with the hanging ring 22 to form the filter stand 2, the suspended bag body 214 can be in any shape or in any size to be placed into different kettles or mugs 4A (as shown in FIG. 2C) or paper drinking cup 4B (as shown in FIG. 2D). As long as the caliber of the container is suitable for the enlarged hanging portions 223 of the main frame 222 of the hanging ring 22 to be placed across the top rim 41, any container can be used. When the user goes out, any container 4 nearby can be used for brewing anytime anywhere. It is very convenient for use.

Figure 3:
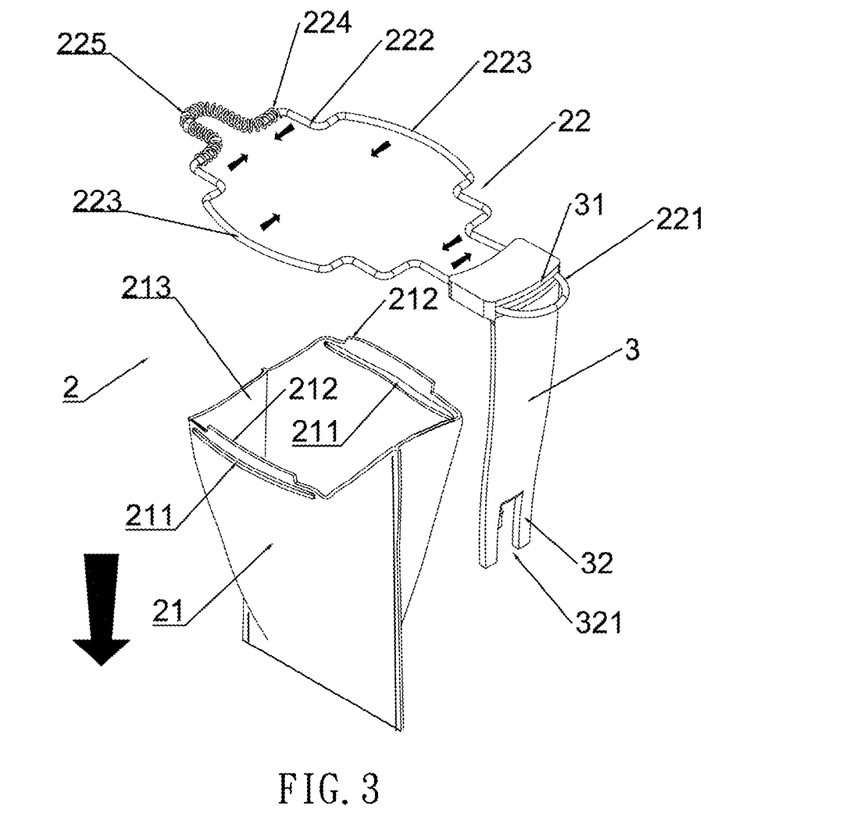
FIG. 3 is a schematic view showing the removal of the filter bag of the present invention in a use state.

As shown in FIG. 3, after brewing, the filter stand 2 (as shown in FIG. 2) is removed. The user pulls the upper edge of the hanging slit 211 at one side of the filter bag 21 outward. Because the main frame 222 is retractable, the hanging slit 211 can be quickly removed from the hanging portion 223 at the same side. The bag body 214 of the filter bag 21 has the weight of the grounds containing water, so the hanging slit 211 at the other side can be released quickly to fall down from the other hanging portion 223, and the hanging ring 22 is restored to the state ready for use, as shown in FIG. 1A.

As shown in FIG. 3, after brewing, the filter stand 2 (as shown in FIG. 2) is removed. When the user presses the two sides of the main frame 222 inward, the distance between the hanging portions 223 of the two sides of the main frame 222 is shortened because the coil spring 225 is deformed, so that the hanging slits 211 at the two sides of the filter bag 21 lose the support of the hanging portions 223 and the bag body 214 of the filter bag 21 has the weight of the coffee grounds containing water to slide down quickly. The hanging ring 22 is restored to the state ready for use, as shown in FIG. 1A.

Thus, it is obvious to demonstrate that the present invention provides excellent convenience in terms of preparations for cleaning and reusing after use, and that the user does not have to touch the filter bag 21 at all. Such a way is clean and hygienic.

Figure 4:
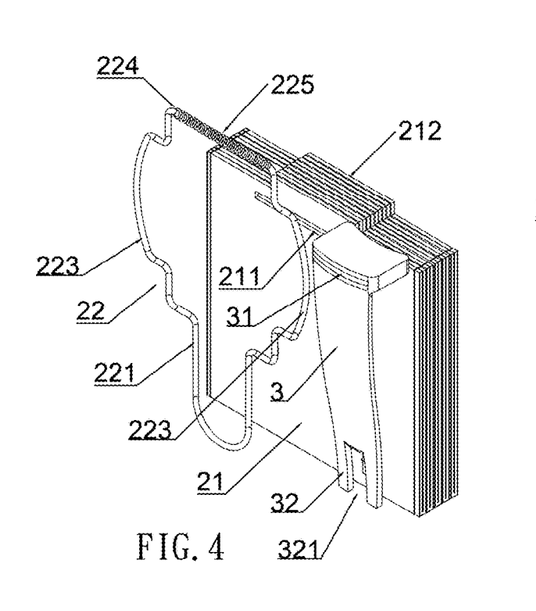
FIG. 4 is a schematic view showing that the components of the present invention are stacked for carrying.

As shown in FIG. 4, the filter bag 21 is in a flattened shape. A plurality of filter bags 21 can be stacked one by one for carrying. Besides, the area of the annular hanging ring 22 is less than that of the filter bag 21, and the annular hanging ring 22 and the handle 3 can be separated from each other. All the filter bags 21, the hanging ring 22, and the handle 3 can be stacked and stored in a bag slightly greater in size than the filter bags 21 for carrying. The user only needs to supply coffee powders, tea leaves, or the like. When going out, any container 4 or cup or paper cup nearby able to accommodate the filter bag 21 can be used for brewing anytime anywhere, and it is convenient for cleaning after brewing to meet the requirements for carrying conveniently.

Figure 5A:
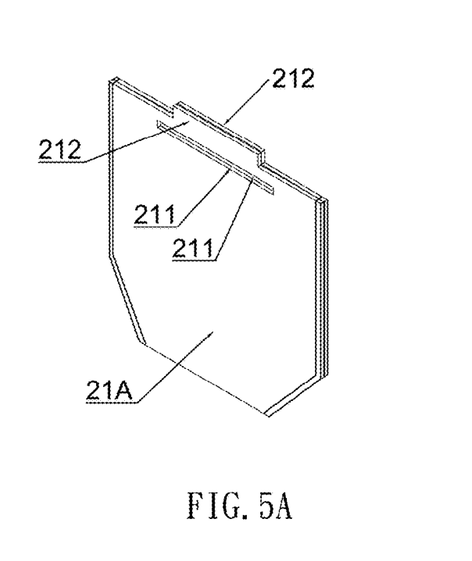
FIG. 5A is a perspective view of another embodiment of the filter bag of the present invention.
Figure 5B:
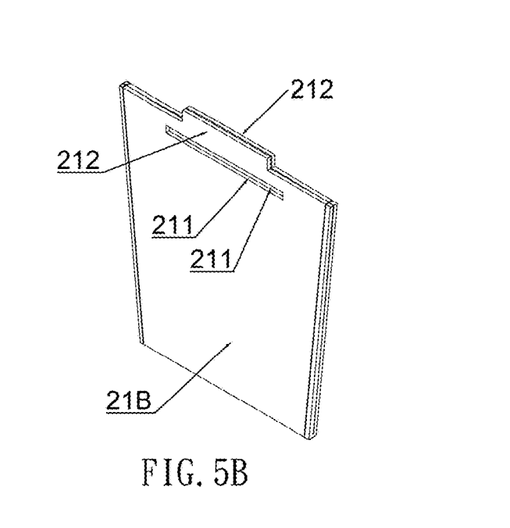
FIG. 5B is a perspective view of a further embodiment of the filter bag of the present invention.
Figure 5C:
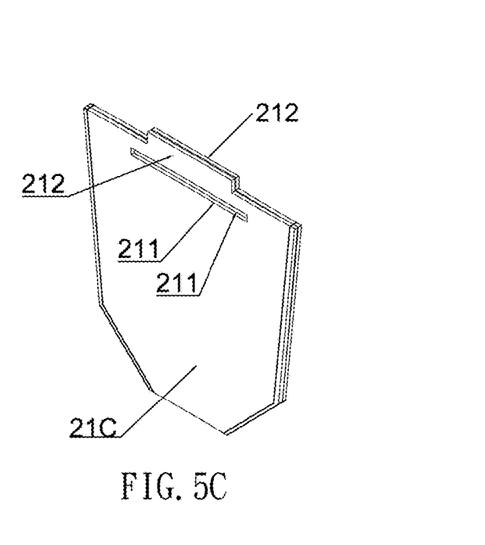
FIG. 5C is a perspective view of yet another embodiment of the filter bag of the present invention.

According to the aforesaid and the drawings, the filter bag 21 is a straight bag. In order to reduce the area or to provide a centralized filter effect, the filter bag 21 may be a centralized-type filter bag 21A (as shown in FIG. 5A). Lower sections of two sides of the centralized-type filter bag 21 are reduced toward the bottom of the filter bag. The filter bag 21 may be a guide-type filter bag 21B (as shown in FIG. 5B) which has two inward oblique sides. The filter bag 21 may be a centralized-guide-type filter bag 21C (as shown in FIG. 5C). The centralized-guide-type filter bag 21C has two inward oblique sides and lower sections of the two inward oblique sides are reduced toward the bottom of the filter bag. The filter bag can be in any shape, not limited thereto.

The filter bag 21 according to the aforesaid and the drawings may be formed with a pair of nip portions 212 located above the pair of the hanging slits 211 and extending upward from the middle portion of the opening 213 for the user to nip the filter bag 21 conveniently. It is beneficial to pull the filter bag 21 correctly and to enlarge the hanging slits 211, so that the filter bag 21 can be hanged on the hanging ring 22 quickly.

Accordingly, the hanging device with the disposable beverage filter bag of the present invention is compact and convenient for assembly and disassembly, and can be stored and carried conveniently for the user to brew coffee or tea anytime anywhere.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hanging device with a disposable beverage filter bag, comprising:
a filter bag (21), made of a filter fabric or filter paper to form a flattened single-opening bag, the filter bag having an opening at an upper end thereof and a pair of hanging slits (211) transversely symmetrically located at middle sections of two sides close to the upper end, the hanging slits being half the width of the opening;
a hanging ring (22), made of a stainless steel wire by winding, a rear section of the hanging ring being a U-shaped holding portion (221), a front section of the hanging ring (22) symmetrically extending forward from the holding portion and having a notch (224) at a frontmost end and the notch being connected with two ends of a coil spring (225) to form a retractable main frame (222), middle sections of two sides of the main frame (222) protruding outward to form a pair of hanging portions (223) each having a width slightly greater than that of the hanging slits (211) of the filter bag, the pair of hanging portions (223) being placed across a top rim of a container (4); wherein, when in use, the pair hanging slits (221) of the filter bag are hanged on the pair of hanging portions (223) by the hanging potions (223) to pass through the pair of hanging slits (221), so that an upper section of the filter bag is to form a rectangular shape to open the opening and a lower section of the filter bag is uprightly suspended beneath the hanging ring (22) to form a filter stand for brewing coffee or tea.

2. The hanging device with a disposable beverage filter bag as claimed in claim 1, wherein a rear section of the holding portion (221) of the hanging ring is provided with a handle (3), the handle has a forked portion with a clip opening (321) at a lower end thereof and a transverse connecting slot (31) at an upper end thereof, the holding portion (221) is inserted through the connecting slot (31) so that the handle (3) is movable along the holding portion (221), when in use, the forked portion with the clip opening (321) clamps the top rim of the container, such that the filter stand is connected above the container and stand stably.

3. The hanging device with a disposable beverage filter bag as claimed in claim 1, wherein the filter bag (21) is a straight bag.

4. The hanging device with a disposable beverage filter bag as claimed in claim 1, wherein the filter bag has two sides with lower sections thereof being reduced toward a bottom thereof.

5. The hanging device with a disposable beverage filter bag as claimed in claim 1, wherein the filter bag has two inward oblique sides.

6. The hanging device with a disposable beverage filter bag as claimed in claim 1, wherein the filter bag has two inward oblique sides and lower sections of the two inward oblique sides are reduced toward a bottom thereof.

7. The hanging device with a disposable beverage filter bag as claimed in claim 1, wherein the filter bag is formed with a pair of nip portions (212) located above the pair of the hanging slits and extending upward from a middle portion of the opening.

* * * * *